United States Patent
Nakamura

(10) Patent No.: US 9,489,021 B2
(45) Date of Patent: Nov. 8, 2016

(54) INSERTION AND EXTRACTION STRUCTURE WITH INCLINED SURFACES OF CARD-SHAPED COMPONENT AND ELECTRONIC APPARATUS INCLUDING THE SAME

(71) Applicant: KYOCERA Corporation, Kyoto-shi, Kyoto (JP)

(72) Inventor: Kotaro Nakamura, Daito (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/866,532

(22) Filed: Sep. 25, 2015

(65) Prior Publication Data

US 2016/0018860 A1 Jan. 21, 2016

Related U.S. Application Data

(63) Continuation of application No. PCT/JP2014/058817, filed on Mar. 27, 2014.

(30) Foreign Application Priority Data

Mar. 27, 2013 (JP) ................................ 2013-066882

(51) Int. Cl.
*G06F 13/00* (2006.01)
*G06F 1/18* (2006.01)
(Continued)

(52) U.S. Cl.
CPC ............ *G06F 1/186* (2013.01); *G06F 13/409* (2013.01); *G06F 13/4068* (2013.01); *G06K 7/003* (2013.01); *G06K 7/0021* (2013.01); *G06K 7/0056* (2013.01)

(58) Field of Classification Search
USPC ......... 710/300–308; 455/550.1, 551.1–554.1
See application file for complete search history.

(56) References Cited

U.S. PATENT DOCUMENTS 5,257,414 A * 10/1993 Trahan ................. G06K 7/0021
235/441
6,210,193 B1 * 4/2001 Ito ........................ G06K 7/0021
439/326

(Continued)

FOREIGN PATENT DOCUMENTS

EP 1746526 A1 1/2007
JP 2002-024770 A 1/2002

(Continued)

OTHER PUBLICATIONS

International Search Report dated Jun. 10, 2014, issued for International Application No. PCT/JP2014/058817.

(Continued)

*Primary Examiner* — Raymond Phan
(74) *Attorney, Agent, or Firm* — Procopio Cory Hargreaves and Savitch LLP

(57) ABSTRACT

An insertion and extraction structure of a card-shaped component includes a slot receiving a card-shaped component in an insertable and extractable manner. The slot has a first surface slidably guiding one surface of the card-shaped component and a second surface located opposite the first surface and slidably guiding the other surface of the card-shaped component. The insertion and extraction structure of a card-shaped component further includes a first inclined surface and a second inclined surface. The first inclined surface projects from the first surface while being inclined in an extraction direction of the card-shaped component. The second inclined surface is located apart from the first inclined surface in the extraction direction and, with one end portion of the card-shaped component yet to be completely extracted from the slot, abuts the other end portion of the card-shaped component. The second inclined surface is steeper than the first inclined surface.

5 Claims, 4 Drawing Sheets

(51) Int. Cl.
*G06K 7/00* (2006.01)
*G06F 13/40* (2006.01)

(56) References Cited

U.S. PATENT DOCUMENTS

| | | | |
|---|---|---|---|
| 6,398,572 B1 | 6/2002 | Larsson | |
| 6,400,965 B1* | 6/2002 | Phillips | H04W 24/00 379/357.01 |
| 6,665,544 B1* | 12/2003 | Michel | H04B 1/3816 455/550.1 |
| 7,427,206 B2* | 9/2008 | Takei | G06K 13/0831 439/159 |
| 2008/0200057 A1* | 8/2008 | Ming | G06K 13/0862 439/326 |
| 2011/0237314 A1 | 9/2011 | Kajiwara et al. | |

FOREIGN PATENT DOCUMENTS

| | | |
|---|---|---|
| JP | 2003-510697 A | 3/2003 |
| JP | 2003-304313 A | 10/2003 |
| JP | 2008-287651 A | 11/2008 |
| JP | 2011-203494 A | 10/2011 |

OTHER PUBLICATIONS

Written Opinion of the International Searching Authority issued by Japan Patent Office for International Application No. PCT/JP2014/058817.

\* cited by examiner

INSERTION AND EXTRACTION STRUCTURE WITH INCLINED SURFACES OF CARD-SHAPED COMPONENT AND ELECTRONIC APPARATUS INCLUDING THE SAME

CROSS-REFERENCE TO RELATED APPLICATION

The present application is a continuation of international application PCT Application No. PCT/JP2014/058817 filed on Mar. 27, 2014, entitled "CARD-LIKE PART INSERTION/EXTRACTION STRUCTURE AND ELECTRONIC DEVICE WITH SAME", which claims the benefit of Japanese Application No. 2013-066882 filed on Mar. 27, 2013, entitled "INSERTION AND EXTRACTION STRUCTURE OF CARD-SHAPED COMPONENT AND ELECTRONIC APPARATUS INCLUDING THE SAME". The disclosure of the above applications are each incorporated by reference.

FIELD

Embodiments of the present disclosure relate to the insertion and extraction structure of a card-shaped component.

BACKGROUND

An electronic apparatus such as a mobile phone or a smartphone includes a slot that receives a card-shaped electronic component (hereinafter, referred to as a "card-shaped component") inserted and extracted by a user, such as a SIM (subscriber identity module) card, an SD card (secure digital memory card), or a microSD card.

SUMMARY

An insertion and extraction structure of a card-shaped component and an electronic apparatus including the same are disclosed. In one embodiment, an insertion and extraction structure of a card-shaped component includes a slot, a first inclined surface, and a second inclined surface. The slot includes a first surface slidably guiding one surface of a card-shaped component and a second surface located opposite the first surface and slidably guiding the other surface of the card-shaped component. The slot receives the card-shaped component in an insertable and extractable manner. The first inclined surface projects from the first surface while being inclined in an extraction direction of the card-shaped component. The second inclined surface is located apart from the first inclined surface in the extraction direction and, with one end portion of the card-shaped component not yet completely extracted from the slot, abuts the other end portion of the card-shaped component. The second inclined surface is steeper than the first inclined surface.

In one embodiment, an electronic apparatus includes an insertion and extraction structure of a card-shaped component. The insertion and extraction structure includes a slot, a first inclined surface, and a second inclined surface. The slot includes a first surface slidably guiding one surface of a card-shaped component and a second surface located opposite the first surface and slidably guiding the other surface of the card-shaped component. The slot receives the card-shaped component in an insertable and extractable manner. The first inclined surface projects from the first surface while being inclined in an extraction direction of the card-shaped component. The second inclined surface is located apart from the first inclined surface in the extraction direction and, with one end portion of the card-shaped component not yet completely extracted from the slot, abuts the other end portion of the card-shaped component. The second inclined surface is steeper than the first inclined surface.

DETAILED DESCRIPTION

Figure 1:
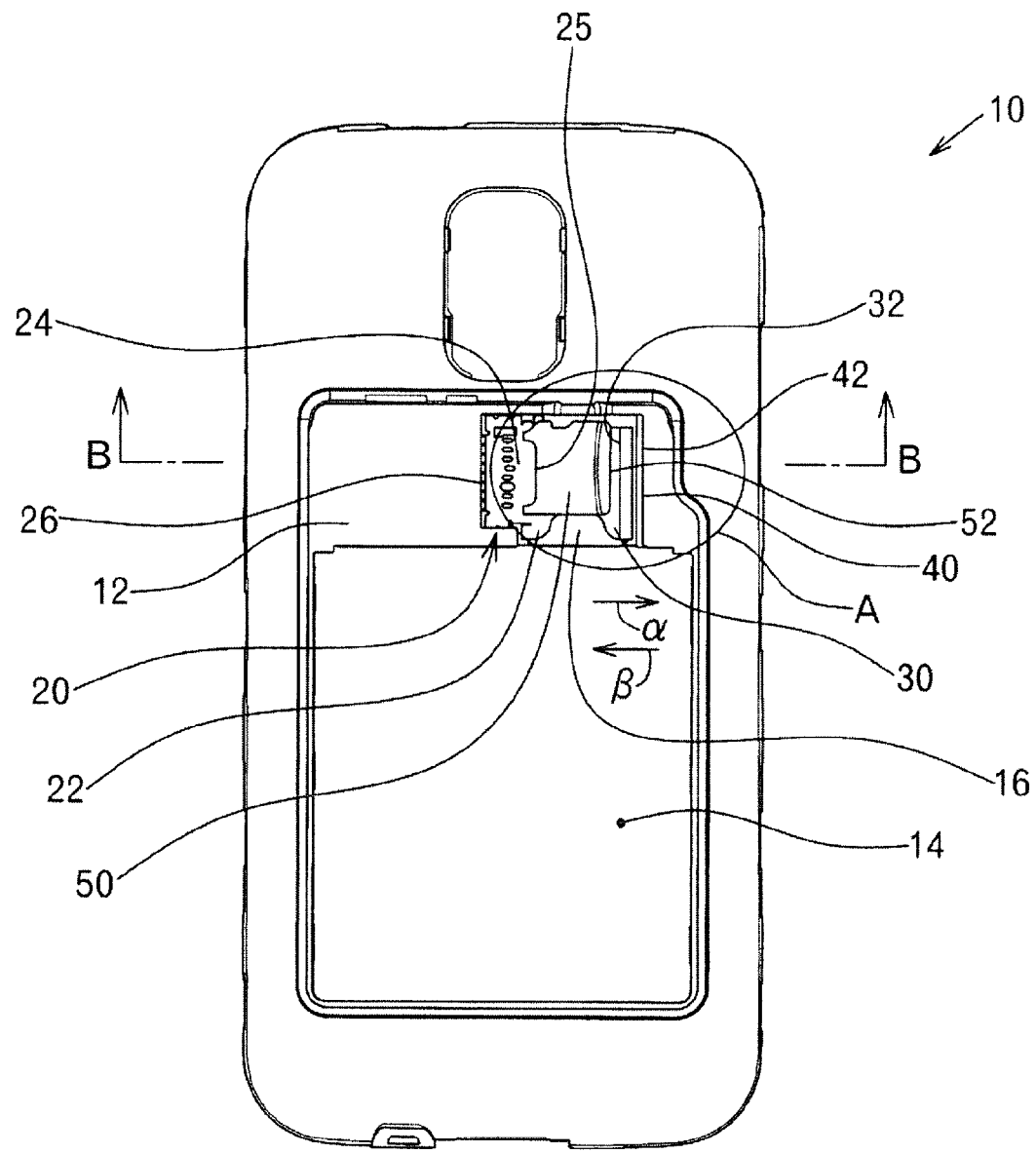
FIG. 1 illustrates a rear view of an electronic apparatus, which illustrates a state in which a card-shaped component is being extracted.

Embodiments of the present disclosure relate to an insertion and extraction structure of a card-shaped electronic component (card-shaped component 50) inserted and extracted by a user, such as a SIM card, an SD card, or a microSD card. Examples of an electronic apparatus 10 to which the insertion and extraction structure of a card-shaped component is applied include a mobile phone, a smartphone, a PDA (personal digital assistant), a tablet terminal, an IC recorder, and a voice recorder.

Described below is an example in which the insertion and extraction structure of the card-shaped component 50 is applied to the electronic apparatus 10 such as a smartphone, and the card-shaped component 50 is a microSD card.

The insertion and extraction structure of the card-shaped component 50 includes, as illustrated in FIGS. 1 to 4, a slot 20 into which the card-shaped component 50 is inserted, and a first inclined surface 30 and a second inclined surface 40 provided in the extraction direction (arrow α) in which the card-shaped component 50 is extracted from the slot 20.

Figure 2:
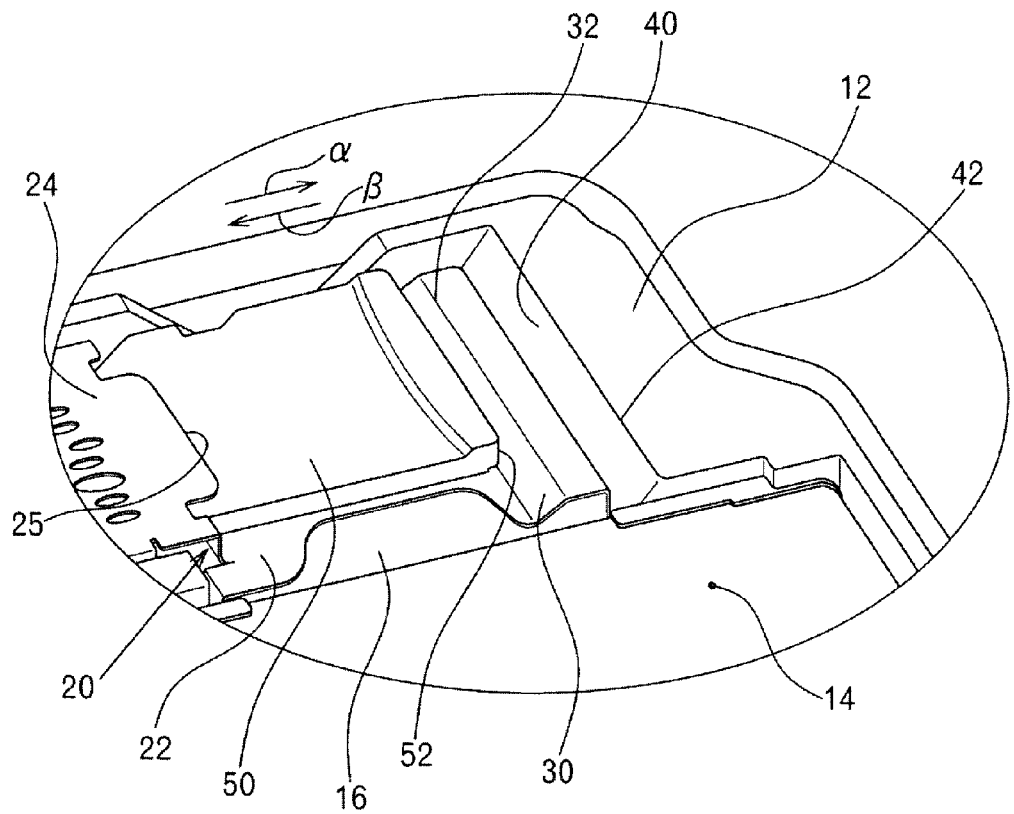
FIG. 2 illustrates a perspective view of a circled portion A of FIG. 1, which illustrates a state in which the card-shaped component is received in a slot.
Figure 3:
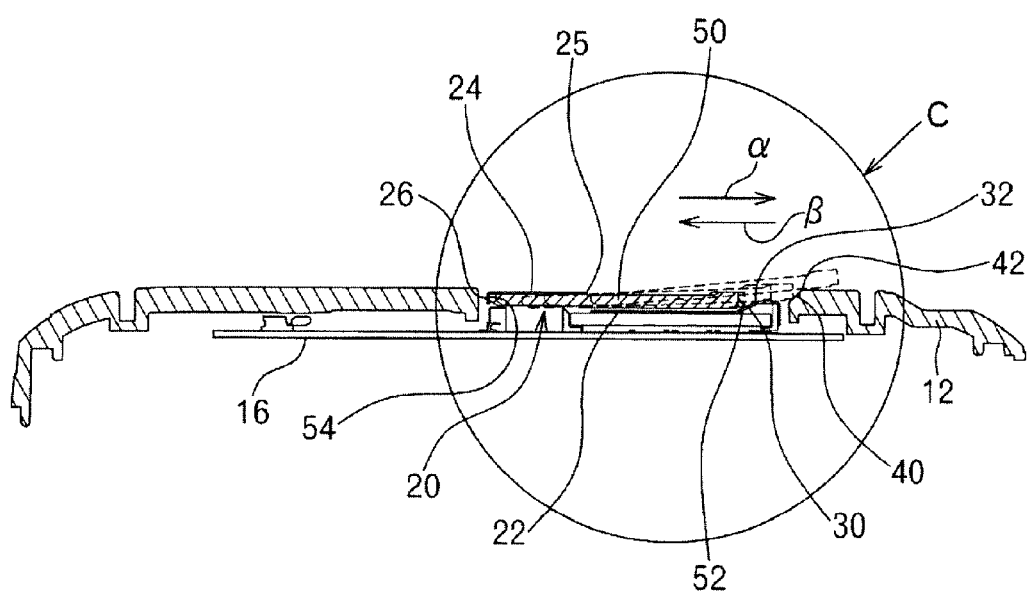
FIG. 3 illustrates a cross-sectional view of a main part, taken along a line B-B of FIG. 1.

As illustrated in FIGS. 1 and 2, the insertion and extraction structure of the card-shaped component 50 can be provided near a battery receiving 14 recessed in an inner chassis 12 located on the rear surface of the electronic apparatus 10. FIGS. 1 and 2 illustrate that the insertion and extraction structure of the card-shaped component 50 is disposed on a substrate 16. In normal use, the inner chassis 12 is covered with a lid (not shown) from the rear side. In normal use, accordingly, the battery receiving 14 and the insertion and extraction structure of the card-shaped component 50 are not visible from the outside.

As illustrated in FIGS. 1 to 4, the slot 20 includes a first surface 22 slidably guiding one surface of the card-shaped component 50 and a second surface 24 slidably guiding the other surface of the card-shaped component 50. In the following description, the first surface 22 side is referred to as a lower side, and the second surface 24 side is referred to as an upper side.

Figure 4:
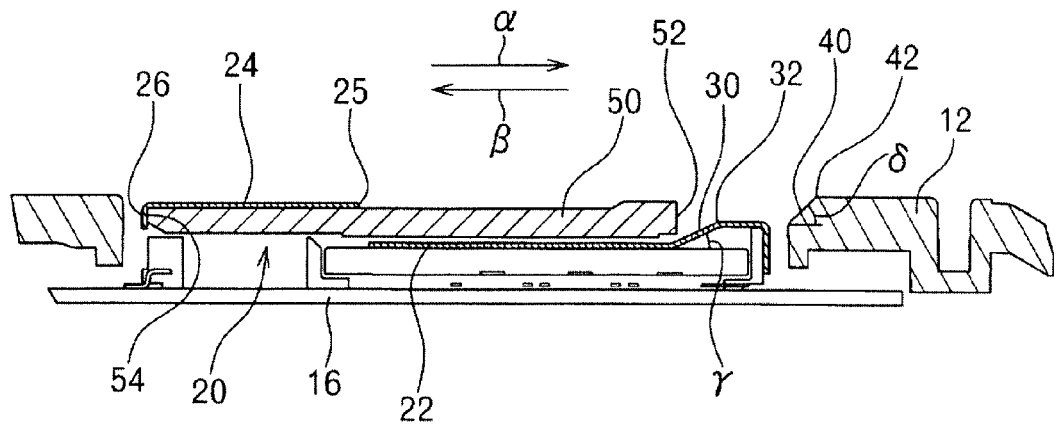
FIG. 4 illustrates a perspective view of a circled portion C of FIG. 3, which illustrates a state in which the card-shaped component is received in the slot.

The first surface 22 and the second surface 24 are disposed with a vertical spacing, slightly larger than the thickness of the card-shaped component 50 to be inserted, left therebetween. As illustrated in FIG. 4, on the first surface 22 of the slot 20, a contact terminal (not shown) having spring properties protrudes in the insertion direction (arrow β) of the card-shaped component 50. The contact terminal is electrically connected with an electrical contact for the card-shaped component.

The end of the slot 20 in the insertion direction (arrow β) is blocked, which serves as an insertion-side stopper 26 of one end portion 54 of the card-shaped component 50.

The first surface 22 is formed so as to be longer than the second surface 24 in the extraction direction (arrow α) and has such a length that its edge portion in the extraction direction (arrow α) substantially coincides with the card-shaped component 50 to be inserted.

The second surface 24 is formed so as to be shorter than the card-shaped component 50 in the extraction direction (arrow α).

The first surface 22 and the second surface 24 are each formed of a metal sheet. The first surface 22 and the second surface 24 can be produced by bending a plurality of metal sheets as required and combining the plurality of metal sheets. The stopper 26 is formed by bending the edge portion of the second surface 24 downward. The first surface 22 and the second surface 24 can also be produced from one metal sheet.

At the edge portion of the first surface 22 in the extraction direction (arrow α) is formed a first inclined surface 30 projecting while being inclined upward from the first surface 22.

Figure 5:
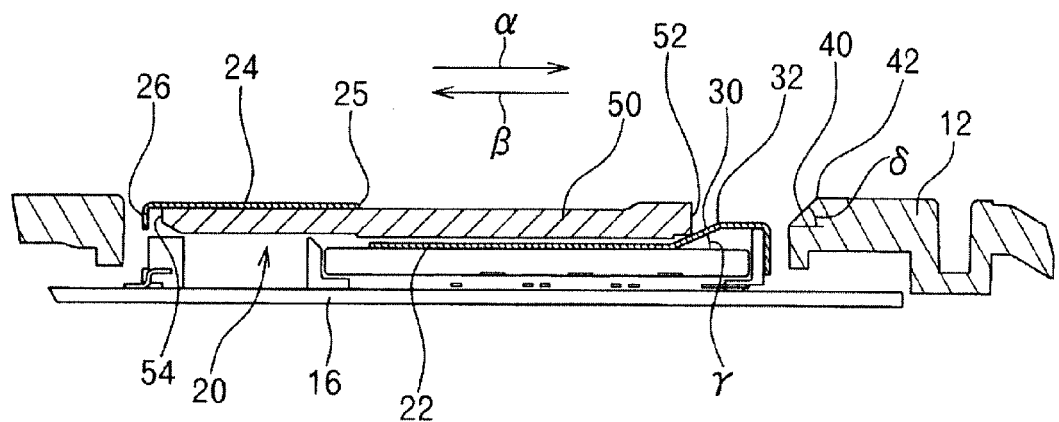
FIG. 5 illustrates a cross-sectional view showing a state in which the card-shaped component is being extracted, starting from the state of FIG. 4.

The first inclined surface 30 is formed such that, as illustrated in FIG. 5, the other end portion 52 of the card-shaped component 50 in the extraction direction abuts the first inclined surface 30 when the extraction of the card-shaped component 50 is started in the extraction direction (arrow α). The first inclined surface 30 preferably has an angle of inclination γ of 30° to 40°.

The first inclined surface 30 preferably has a top 32 located at a position slightly lower than the second surface 24. Forming the top 32 of the first inclined surface 30 at a position higher than the second surface 24 causes a fear that while the other end portion 52 of the card-shaped component 50 in the extraction direction is climbing the first inclined surface 30, the card-shaped component 50 may experience a large force in such a direction that the card-shaped component 50 bends, with the edge portion 25 of the second surface 24 in the extraction as a fulcrum, and may accordingly fail to move smoothly.

The first inclined surface 30 is desirably formed in such a range that the upper surface of the card-shaped component 50 abuts the edge portion 25 of the second surface 24 in the extraction direction while the other end portion 52 of the card-shaped component 50 in the extraction direction is abutting the first inclined surface 30.

For example, the first inclined surface 30 can be integrally formed with the first surface 22 by bending a metal sheet. The first inclined surface 30 may also be formed of a member separate from that of the first surface 22.

Figure 7:
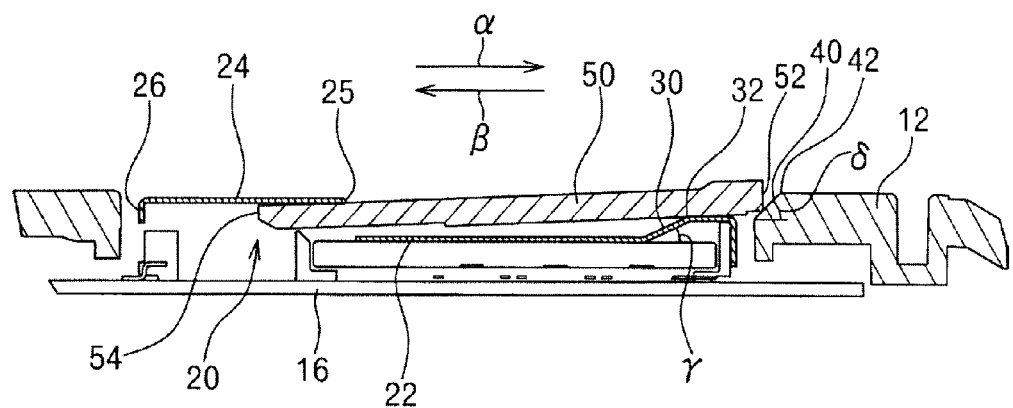
FIG. 7 illustrates a cross-sectional view showing the state in which the card-shaped component is being extracted, following FIG. 6.

The second inclined surface 40 steeper than the first inclined surface 30 is formed on the side beyond the top 32 of the first inclined surface 30 in the extraction direction (arrow α). The second inclined surface 40 is formed in such a range that the other end portion 52 of the card-shaped component 50 in the extraction direction abuts the second inclined surface 40 while the card-shaped component 50 is not yet completely extracted from the slot 20, that is, as illustrated in FIG. 7, the one end portion 54 of the card-shaped component 50 in the insertion direction stays below the second surface 24.

The angle of inclination δ of the second inclined surface 40 is greater than the angle of inclination γ of the first inclined surface 30, which is preferably 40° to 60°.

Figure 6:
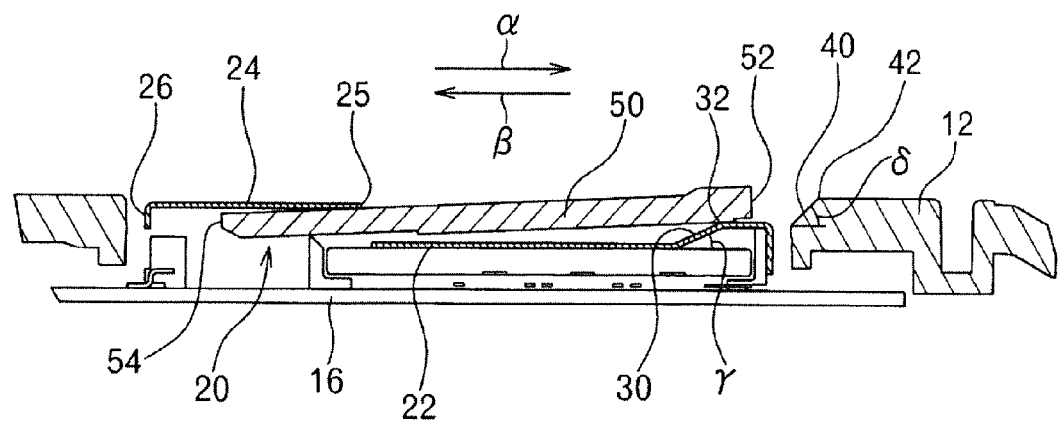
FIG. 6 illustrates a cross-sectional view showing the state in which the card-shaped component is being extracted, following FIG. 5.

As illustrated in FIGS. 2 and 4, the second inclined surface 40 is desirably formed at a position apart from the top 32 of the first inclined surface 30 in the extraction direction (arrow α). This allows, as illustrated in FIG. 6, the card-shaped component 50 to be extracted gently in the extraction while the top 32 of the first inclined surface 30 and the lower surface of the card-shaped component 50 initially abut each other, thereby enabling smooth extraction of the card-shaped component 50. Also, the second inclined surface 40 can be formed continuously with the first inclined surface 30.

The second inclined surface 40 preferably has a top 42 located at such a position that the top 42 abuts the lower surface of the card-shaped component 50 immediately before the card-shaped component 50 is extracted from the slot 20, that is, immediately before the card-shaped component 50 is extracted from the second surface 24.

The second inclined surface 40 is formed by inclining the inner chassis 12 of the electronic apparatus 10. Alternatively, the second inclined surface 40 may also be formed by bending a metal sheet similarly to the first inclined surface 30, or may be formed integrally with the first surface 22 and the first inclined surface 30.

The process of extracting the card-shaped component 50 in the insertion and extraction structure of the card-shaped component 50 configured as described above is described with reference to FIGS. 4 to 8.

FIG. 4 illustrates a state in which the card-shaped component 50 is completely inserted into the slot 20. From this state, the card-shaped component 50 is pulled in the extraction direction (arrow α) with a finger placed on the upper surface of the card-shaped component 50.

As a result, as illustrated in FIG. 5, the other end portion 52 of the card-shaped component 50 in the extraction direction abuts the first inclined surface 30, and then, the card-shaped component 50 climbs the first inclined surface 30 while being slightly inclined.

In this state, the card-shaped component 50 climbs the first inclined surface 30 while the other end portion 52 in the extraction direction abuts the first inclined surface 30. After the other end portion 52 of the card-shaped component 50 in the extraction direction reaches the top 32 of the first inclined surface 30, as illustrated in FIG. 6, the lower surface of the card-shaped component 50 overlaps onto the top of the first inclined surface 30. On this occasion, the lower surface of the card-shaped component 50 abuts the contact terminal and the top 32 of the first inclined surface 30, and the upper surface of the card-shaped component 50 abuts the edge portion 25 of the second surface 24 in the extraction direction.

In this state, the card-shaped component 50 is pulled further, and then, the other end portion 52 of the card-shaped component 50 in the extraction direction abuts the second inclined surface 40 as illustrated in FIG. 7. When the card-shaped component 50 abuts the second inclined surface 40, the momentum in extracting the card-shaped component 50 is reduced, because the second inclined surface 40 is steeper than the first inclined surface 30. This can prevent the card-shaped component 50 from being extracted from the slot 20 with momentum. Thus, the card-shaped component 50 can be prevented from dropping in the extraction.

With reference to FIG. 7, the card-shaped component 50 is in such a state that the other end portion 52 in the extraction direction abuts the second inclined surface 40, its upper surface abuts the edge portion 25 of the second surface 24 in the extraction direction, and its lower surface abuts the top 32 of the first inclined surface 30 and the contact terminal. Thus, if the finger is released in this state and the electronic apparatus 10 is moved such that the extraction direction (arrow α) points downward, the card-shaped component 50 does not drop.

Figure 8:
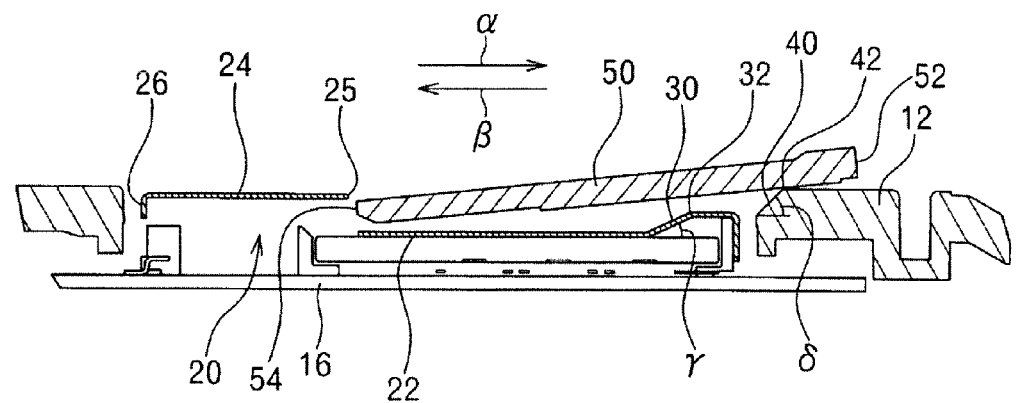
FIG. 8 illustrates a cross-sectional view showing a state in which the card-shaped component has been extracted, following FIG. 7.

Pulling the card-shaped component 50 further from the state of FIG. 7 moves the one end portion 54 of the card-shaped component 50 in the insertion direction away from the second surface 24, as illustrated in FIG. 8. This completes the extraction of the card-shaped component 50.

As described above, the insertion and extraction structure of the card-shaped component 50 can reduce the extraction momentum of the card-shaped component 50 when the card-shaped component 50 is being extracted, thereby preventing the card-shaped component 50 from dropping due to the momentum of the extraction.

To insert the card-shaped component 50, the card-shaped component 50 may be pushed into the slot 20 from the state of FIG. 8.

While the embodiment of the present disclosure have been shown and described in detail, the foregoing description is in all aspects illustrative and not restrictive. It is therefore understood that numerous modifications and variations can be devised without departing from the scope of the disclosure.

The invention claimed is:

1. An insertion and extraction structure of a card-shaped component, comprising:
   a slot including a first surface slidably guiding one surface of a card-shaped component and a second surface located opposite the first surface and slidably guiding the other surface of the card-shaped component, the slot receiving the card-shaped component in an insertable and extractable manner;
   a first inclined surface projecting from the first surface while being inclined in an extraction direction of the card-shaped component; and
   a second inclined surface located behind and apart from the first inclined surface in the extraction direction and, with one end portion of the card-shaped component not yet completely extracted from the slot, abutting the other end portion of the card-shaped component, the second inclined surface being steeper than the first inclined surface.

2. The insertion and extraction structure of a card-shaped component according to claim 1, wherein the second inclined surface is positioned apart from a top of the first inclined surface in the extraction direction.

3. The insertion and extraction structure of a card-shaped component according to claim 1, wherein the first surface and the first inclined surface are integrally formed of a metal sheet.

4. The insertion and extraction structure of a card-shaped component according to claim 2, wherein with the card-shaped component not yet completely extracted from the slot, the one surface of the card-shaped component abuts the top of the first inclined surface, the other end portion of the card-shaped component abuts the second inclined surface, and the other surface of the card-shaped component abuts an end of the second surface in the extraction direction.

5. An electronic apparatus comprising an insertion and extraction structure of a card-shaped component, wherein the insertion and extraction structure includes
   a slot including a first surface slidably guiding one surface of the card-shaped component and a second surface located opposite the first surface and slidably guiding the other surface of the card-shaped component, the slot receiving the card-shaped component in an insertable and extractable manner,
   a first inclined surface projecting from the first surface while being inclined in an extraction direction of the card-shaped component, and
   a second inclined surface located behind and apart from the first inclined surface in the extraction direction and, with one end portion of the card-shaped component not yet completely extracted from the slot, abutting the other end portion of the card-shaped component, the second inclined surface being steeper than the first inclined surface.

\* \* \* \* \*